Patented July 17, 1923.

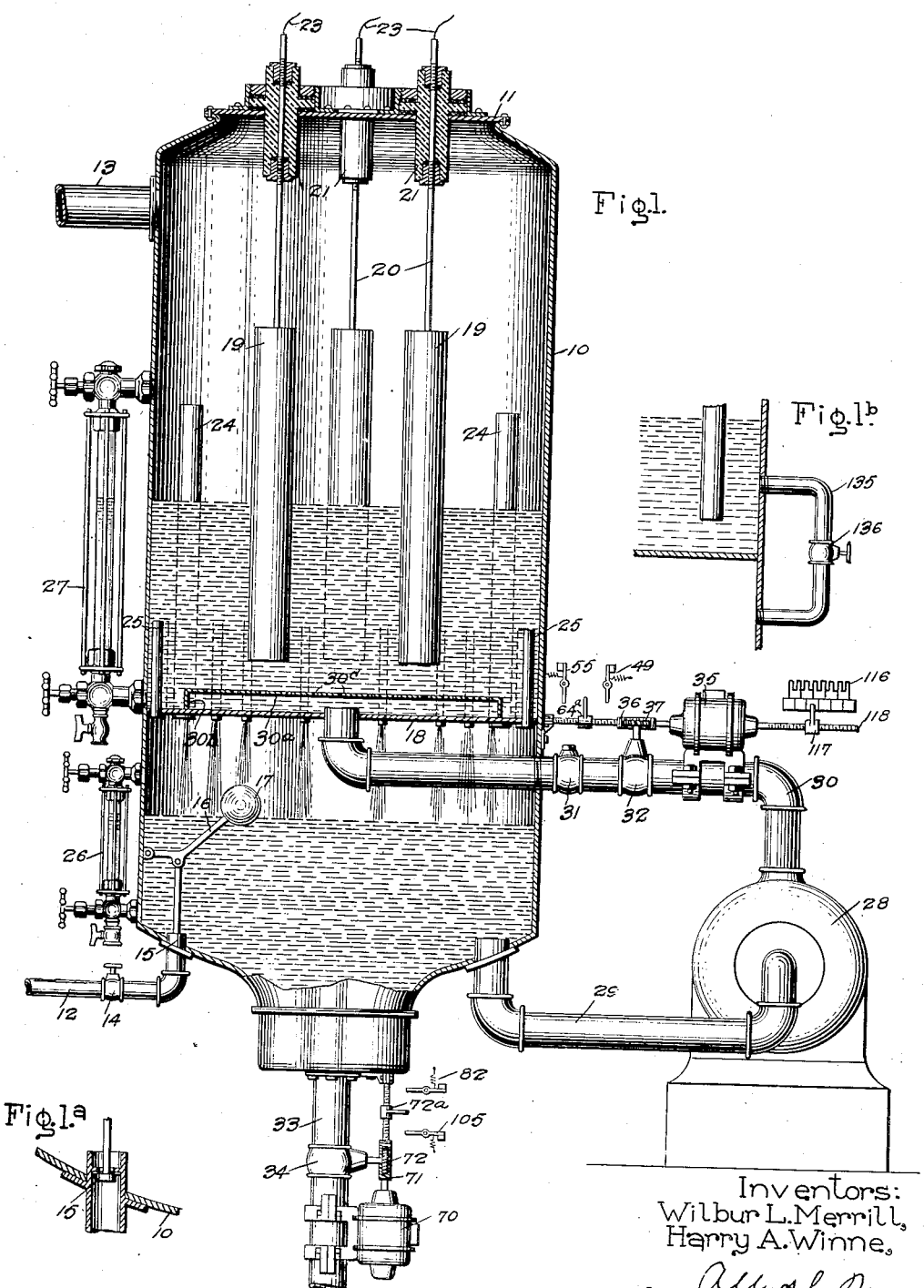

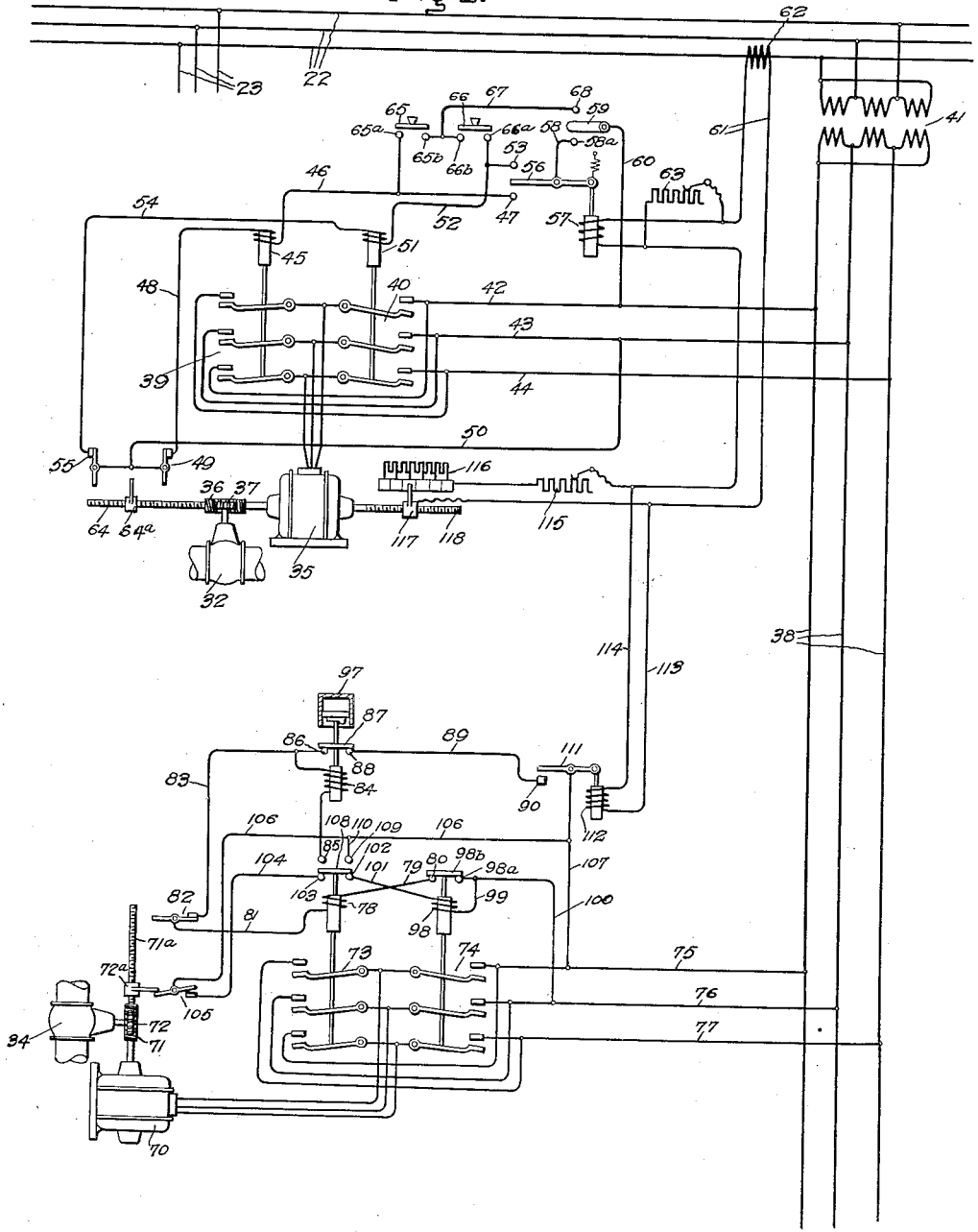

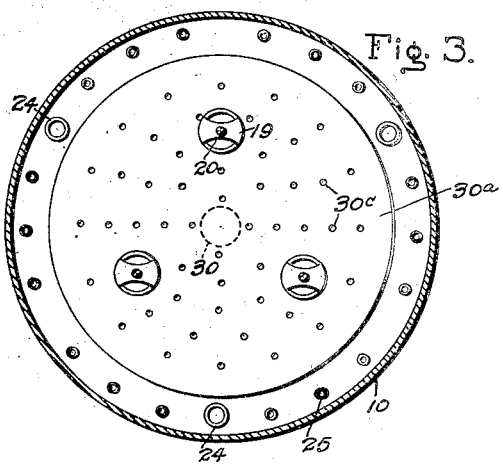
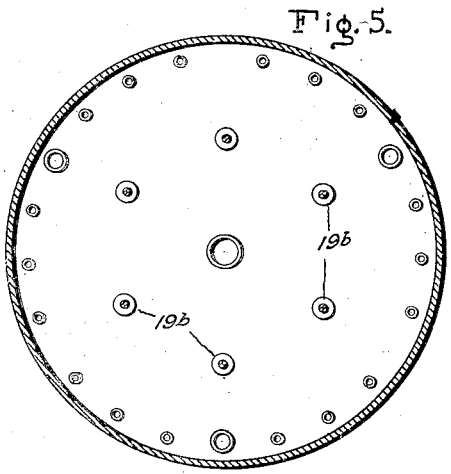
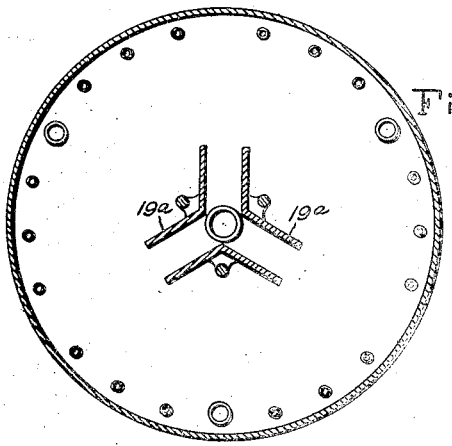
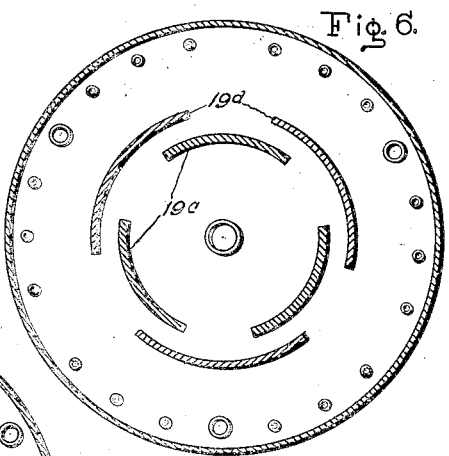
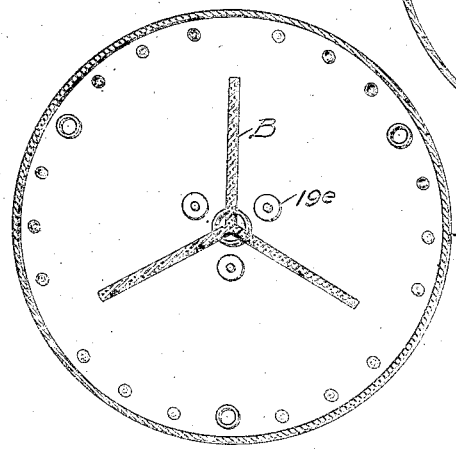

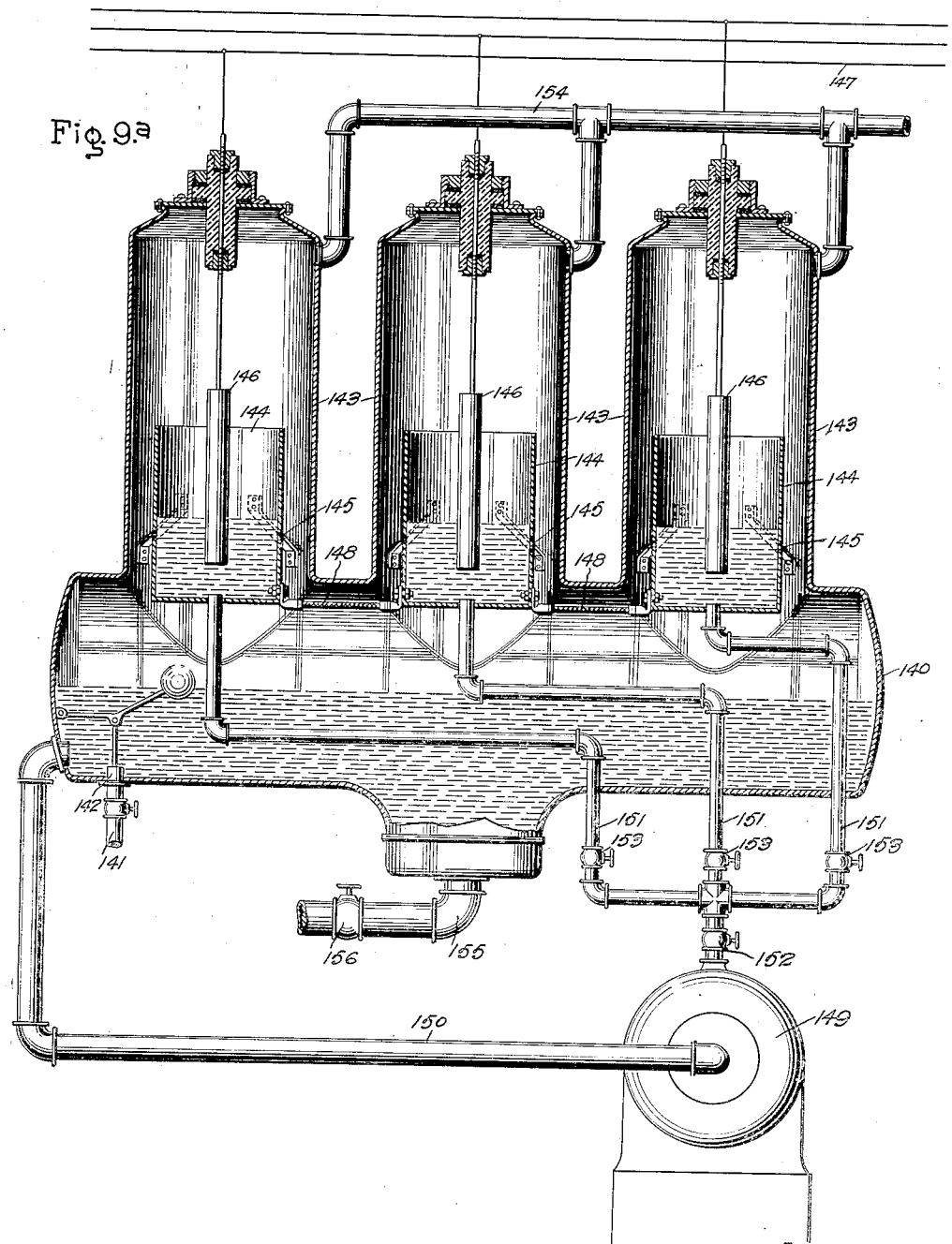

1,462,350

UNITED STATES PATENT OFFICE.

WILBUR L. MERRILL AND HARRY A. WINNE, OF SCHENECTADY, NEW YORK, ASSIGNORS TO GENERAL ELECTRIC COMPANY, A CORPORATION OF NEW YORK.

ELECTRIC STEAM BOILER.

Application filed February 15, 1922. Serial No. 536,665.

*To all whom it may concern:*

Be it known that we, WILBUR L. MERRILL and HARRY A. WINNE, citizens of the United States, residing at Schenectady, county of Schenectady, State of New York, have invented certain new and useful Improvements in Electric Steam Boilers, of which the following is a specification.

The present invention relates to boilers of the type in which steam is generated by electric current passed between electrodes in water and has for its object to provide an improved boiler of this character.

For a consideration of what we believe to be novel, and our invention, attention is directed to the accompanying description and the claims appended thereto.

Figure 8:
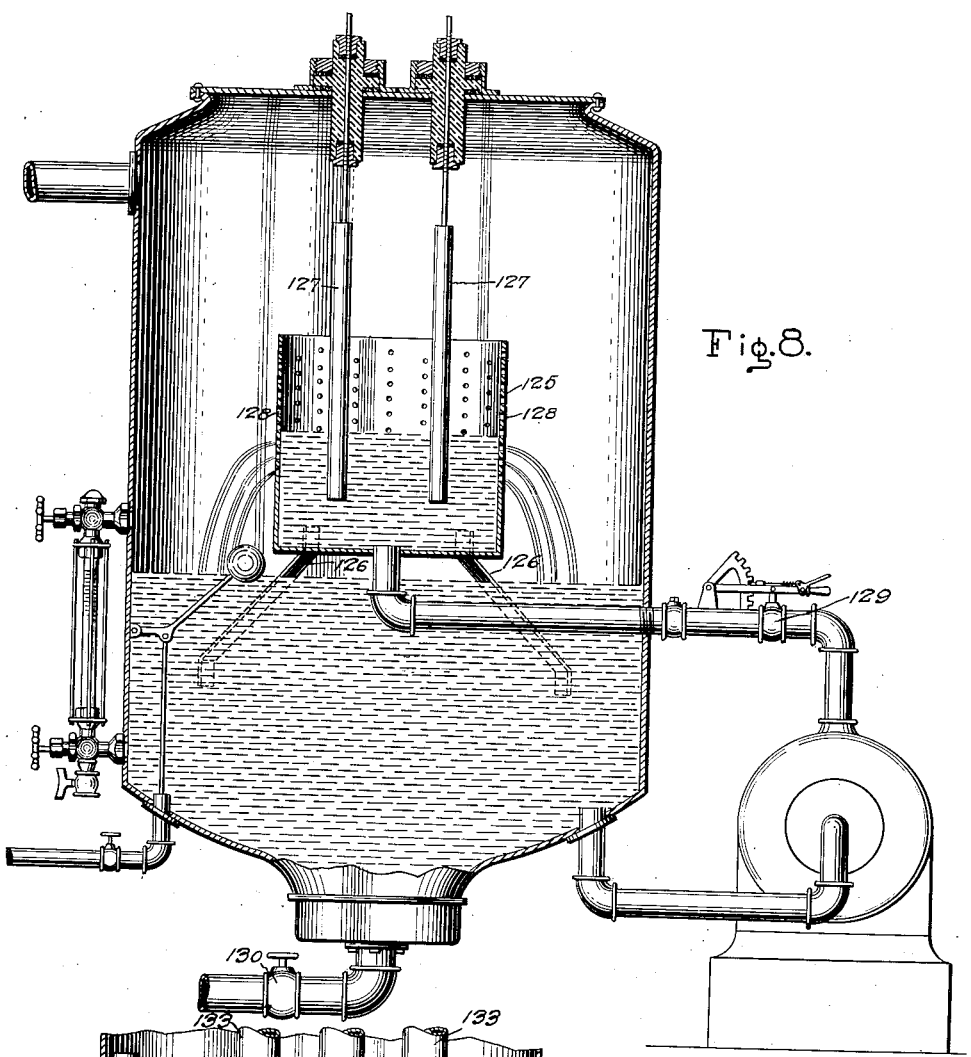
Figure 9:
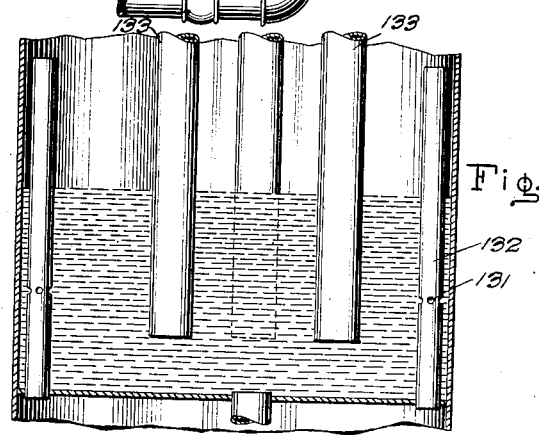

In the drawing, Fig. 1 illustrates a boiler embodying our invention, the shell of the boiler being shown in section; Fig. 1ª is a detail view of a float operated feed water valve; Fig. 1ᵇ is a detail view illustrating a modification; Fig. 2 illustrates an arrangement of control circuits which may be used for regulating the electric motors shown in Fig. 1; Fig. 3 is a transverse sectional view of the boiler shown in Fig. 1; Figs. 4, 5, 6 and 7 are views similar to Fig. 3 showing modified arrangements of electrodes; Fig. 8 is a view similar to Fig. 1 of a modified form of boiler; Fig. 9 illustrates a modification of a detail, and Fig. 9ª illustrates another boiler structure embodying our invention.

Referring to the drawing, particularly to Figs. 1, 2 and 3, 10 indicates the shell of a boiler which may be of any suitable structure and may be provided with an opening in its top closed by a cover plate 11. Connected to the lower end of shell 10 is a feed water pipe 12 through which water is supplied to the boiler and connected to the upper end of the boiler is a conduit 13 through which steam generated in the boiler is drawn off. In pipe 12 is a hand valve 14, and also a float-operated valve 15. The stem of valve 15 is connected to an arm 16 pivoted at one end to the inner wall of shell 10 and provided at its free end with a float 17 which rides on the water in the boiler. Valve 15 is biased toward open position by the weight of the parts and is raised by float 17 to closed position when the water level in the boiler reaches a predetermined height. It thus acts automatically to maintain a substantially constant level of water in the boiler.

In the boiler at a point above the normal water level therein, we provide an electrode chamber adapted to contain the water into which the electrodes dip. In the arrangement shown in Fig. 1, the electrode chamber is formed by a transverse partition plate 18 located in the boiler a suitable distance above the normal water level therein. Projecting into the electrode chamber are electrodes 19, three being shown in the present instance. They may be made of steel or other suitable material and supported in any suitable manner in fixed symmetrical relation to each other. As shown, they are supported by rods 20 which are fixed to insulators 21 carried by cover plate 11. Rods 20 are insulated from and project outside shell 10 and are adapted to have a source of current connected to them. For example, they may be connected to a three-phase alternating current electric power supply of any suitable voltage. In Fig. 2, 22 indicates a source of three-phase alternating current and electrodes 20 are connected thereto by lead wires 23, it being understood that the lead wires will contain such switch and protective devices (not shown) as may be found desirable. For example we may provide an oil circuit breaker in the line adapted to be operated in the usual manner by an overload relay and an underload relay. The electrode chamber is adapted to have maintained therein a level of water determined by the output required from the boiler, and the electrodes 19 dip into this water to a depth depending, of course, on the height at which the level of water is maintained and the adjustment of the electrodes. The space below partition plate 18 is connected to that above the water level in the electrode chamber by suitable conduit means so as to equalize the pressure above and below plate 18, and in Fig. 1 this conduit means comprises one or more pipes 24 which are fixed to plate 18 at their lower ends and project up above the level of the water in the electrode chamber. Preferably they terminate at a point which represents the highest level desirable in the electrode chamber and in case the level tends to exceed this, the excess water will run back through the pipes into the lower portion of the boiler. The pipes 24 thus serve two functions; they serve to equalize the pressure in the boiler and to act as over-flow pipes to limit the upper level of the water in the electrode chamber.

Projecting upwardly from plate 18 is a second set of pipes 25 which serve to connect the space below plate 18 with the electrode chamber. Pipes 25 are fixed in plate 18 at their lower ends and terminate just above the lower ends of electrodes 19. Whenever the water level in the electrode chamber is above the upper end of pipes 25 water runs through them continuously from the electrode chamber to the lower portion of the boiler. Suitable gauges 26 and 27 are provided for indicating the water levels in the boiler and in the electrode chamber respectively.

At 28 is a pump which may be driven by any suitable means such as an electric motor for example. The suction side of the pump is connected by a pipe 29 to the lower portion of the boiler and the discharge side is connected by a pipe 30 to the electrode chamber. In pipe 30 is a non-return check valve 31 which prevents flow of water from the electrode chamber through pipe 30 toward the pump. When pump 28 is running it takes water from the lower end of the boiler and delivers it to the electrode chamber. At the same time water runs from the electrode chamber through pipes 25 to the lower end of the boiler. There is thus a continuous circulation of water set up. Preferably pipe 30 is connected to the electrode chamber at its bottom and adjacent the center, and the pipes 25 are arranged around the outer edge of the electrode chamber so that there is a continuous circulation of water over and around the electrodes, the water flowing from the center outwards. This circulation is with advantage made quite violent so as to prevent the formation of steam bubbles on the surfaces of the electrodes.

To distribute the water entering the electrode chamber through pipe 30 and prevent its flow in large streams we preferably provide a plate 30$^a$ which is supported over the end of pipe 30 by a marginal flange 30$^b$ and is provided with holes 30$^c$ through which the water flows upward. This arrangement insures a flow of water around the electrodes on all sides and a thorough mixing of the incoming water with that already in the electrode chamber.

The level of the water in the electrode chamber is determined by the rate at which pump 28 discharges water to it and the rate at which the water flows from it back to the main supply and hence may be varied by regulating the pump, by regulating the return flow, or by both means. In the case of the pump the output of the pump may be regulated by regulating its speed or by means of a valve in its discharge pipe, or in any other suitable way. In Fig. 1 we have shown a regulator for the pump comprising a valve 32 located in discharge pipe 30 and adapted to be opened and closed to increase and decrease the output of pump 28. The boiler may be regulated also by varying the voltage applied between electrodes.

In operation the electrodes 19 are connected to the source of electrical energy and the electric current flowing between the electrodes through the water heats the water and produces steam which is carried off by conduit 13. As will be clear, the higher the level of the water around the electrodes, i. e., the deeper the electrodes dip into the water, the lower will be the resistance between the electrodes and consequently the greater will be the amount of power utilized in the boiler with a given voltage between the electrodes. The pump 28 continuously supplies water from the lower end of the boiler to the electrode chamber, a part of such water being evaporated and a part flowing back to the lower end of the boiler through pipes 25. The pump is so regulated by setting valve 32 that a level of water will be maintained in the electrode chamber of such height as to give the desired output of steam, or to utilize a desired amount of electrical energy in generating steam according to the requirements of the particular case. The level of water in the electrode chamber is indicated by the gauge 27.

The water ordinarily met with for steam boiler use contains some salt or other impurities and as the water in the boiler is evaporated the amount of impurities in the remaining water increases thereby lowering the electrical resistance of the water. It is accordingly necessary to freshen the water by drawing some of it off and replacing it with fresh water when the impurity content becomes too great. For this purpose we provide a discharge conduit 33 containing a flow-off valve 34 of any suitable type. This valve may be kept closed normally and opened whenever it is desired to freshen the water, or it may be set in a partly open position so that the freshening of the water will go on continuously at a suitable rate; also it may be operated manually or it may be operated automatically as described hereinafter. The salt content of the water is indicated by the amount of current which flows between the electrodes for any given level of water in the electrode chamber and may be regulated accordingly.

The water in the lower end of the boiler constitutes the supply for the electrode chamber and since it is under the same steam pressure as the electrode chamber, the pump 28 is not called upon to take water at a low pressure and pump it into the electrode chamber against a high pressure, i. e., full boiler pressure. This results in a substantial saving in power and in simplification of the structure. The excess water from the electrode chamber runs back directly to the supply in the boiler and is pumped back again to the electrode chamber so that its heat is not lost.

So far as the flow of water from the electrode chamber back to the boiler supply is concerned, simple holes in plate 18 could be used, the pipes 25 being omitted. The purpose of providing pipes 25 is to define a level of water above the lower ends of electrodes 19 below which the water will not fall in case pump 28 should cease to function. The upper ends of tubes 25 terminate above the lower ends of electrodes 19 and should pump 28 cease to function it will be clear that the water in the electrode chamber can only drop down to the level of the plane of the upper ends of the tubes 25. The lower ends of the electrodes are thus kept submerged. This avoids the occurrence of arcing between the lower ends of the electrodes, a thing which might result should the level of the water fall below the ends of the tubes. After the water reaches the level of the upper ends of tubes 25, it will of course continue to lower slowly due to evaporation. However before it will have evaporated enough so that its surface will be below the ends of the electrodes, suitable automatic devices responsive to power input will have functioned to open the usual circuit breaker and disconnect the power supply from the boiler.

The level of water in the electrode chamber is determined by the output of pump 28, other conditions remaining constant, and is quite independent of the level of the water supply in the lower end of the boiler. The water level in the lower end of the boiler, i. e., the water level of the water supply, need not be maintained constant and may vary within a wide range without affecting the rate of power input.

The rate of power input and steam generation may be controlled manually by regulating pump 28 in any suitable manner such as by means of valve 32, or it may be controlled automatically in response to variations in any desired conditions of operation by providing suitable means responsive to such conditions for regulating the pump. Of course, suitable indicating instruments (not shown) are or may be provided for indicating power input to the boiler, the pressure therein, the steam flow therefrom, etc., and the boiler may be regulated in accordance with any one of these instruments. Likewise valves 34 may be regulated automatically in response to salt content of the water for freshening the water. Such automatic arrangements are shown in Figs. 1 and 2 and will now be described.

A motor 35 is provided for opening and closing valve 32, the motor having a worm 36 on its shaft which meshes with a worm wheel 37 on the stem of valve 32. Motor 35 is connected to a source of potential indicated at 38 through a switch 39 which when closed operates the motor in a direction to close valve 32 and a switch 40 which when closed operates the motor in a direction to open valve 32. Source of potential 38 may be derived from main source 22 through a suitable transformer 41 and is connected to switches 39 and 40 by leads 42 and 43 and 44. Switch 39 is adapted to be closed by a solenoid 45, one side of which is connected by a conductor 46 to a contact 47. The other side of solenoid 45 is connected to lead wire 43 by way of conductor 48, limit switch 49 and conductor 50. Switch 40 is adapted to be closed by a solenoid 51, one side of which is connected by a conductor 52 to a contact 53 which stands in spaced relation to contact 47. The other side of solenoid 51 is connected to lead wire 43 by a conductor 54, limit switch 55 and conductor 50. Contact terminals 47 and 53 form the terminals of a two-way switch having a blade 56 which is adapted to be actuated by a solenoid 57. Switch blade 56 is connected to lead wire 42 by a conductor 58, contact 58$^a$, switch blade 59 and conductor 60. The terminals of solenoid 57 are connected by conductors 61 to a current transformer 62 associated with main lead wires 22. By this arrangement the current flowing through solenoid 57 will be proportional to the power supplied through lead wires 22 to the electrodes 19 of the boiler. Connected in parallel to solenoid 57 is an adjustable resistance 63. By varying this resistance the amount of current passing through solenoid 57 may be adjusted. On the shaft of motor 35 is a threaded extension 64 upon which runs a nut 64$^a$ provided with a finger adapted to engage and open limit switches 49 and 55. The purpose of the limit switches is to open the circuits of solenoids 45 and 51 after valve 32 has been fully closed or fully opened, as the case may be, so as to prevent overtravel.

At 65 and 66 are two manually operated push-button switches having contacts 65$^a$ and 66$^a$ connected to conductors 46 and 52, and contacts 65$^b$ and 66$^b$ connected by a conductor 67 to a contact 68 into engagement with which switch blade 59 may be moved. This provides for manual operation of valve 32.

For automatic operation of valve 32, switch blade 59 is placed in engagement with contact 58$^a$ and resistance 63 is adjusted so that with the desired power input to the boiler solenoid 57 will hold switch blade 56 balanced midway between contacts 47 and 53. If now the power input to the boiler increases, the current flowing through solenoid 57 will increase, whereupon the solenoid plunger will be lifted to move contact blade 56 into engagement with contact 47. This closes a circuit on solenoid 45 as follows: lead wire 42, conductor 60, switch blade 59, conductor 58, switch blade 56, conductor 46, solenoid 45, conductor 48, limit switch 49 and conductor 50 to lead wire 43. Solenoid 45 will thereupon close switch 39 thereby closing the circuit of motor 35 causing it to operate in a direction to move valve 32 toward closed position. This decreases the output of pump 28 so that the level of the water in the electrode chamber will fall. When the level of the water falls the resistance between the electrodes is increased so that the boiler will take less power from the source of potential 22.

With decrease in power in line 22 less current will flow through solenoid 57 whereupon its plunger will move downward and lift switch blade 56 from engagement with contact 47. This opens the circuit on solenoid 45 permitting switch 39 to open and stops the motor. On the other hand, in case of a decrease in the power to the boiler, a less amount of current will flow through solenoid 57 whereupon its plunger will move downward lifting switch blade 56 into engagement with contact 53 whereupon a circuit is closed through solenoid 51 as follows: lead wire 42, conductor 60, switch blade 59, conductor 58, switch blade 56, contact 53, conductor 52, solenoid 51, conductor 54, limit switch 55, and conductor 50 to lead wire 43. When the circuit is thus closed through solenoid 51, it will lift its plunger to close switch 40 thereby connecting motor 35 to source of potential 38 to operate it in a direction to open valve 32. As valve 32 opens more water will be supplied to the boiler whereby the level of water in the electrode chamber will be raised. This will decrease the resistance of the boiler so that it will take more power from the source of potential 22. This results in an increase in the amount of current flowing through solenoid 57 whereupon it will raise its plunger and move switch blade 56 out of engagement with contact 53.

It will be clear that the power supplied to the boiler may be adjusted at any time by adjusting resistance 63. If the amount of this resistance in the shunt circuit is increased more current will be caused to pass through solenoid 57 whereupon the plunger of solenoid 57 will be raised to bring switch blade 56 into engagement with contact 47 so that the motor 35 will be operated in a direction to move valve 32 toward closed position. This will effect a decrease in the output of pump 28 and thus a lowering of the level of the water in the electrode chamber so that the resistance between electrodes 19 will be increased and the input to the boiler decreased. A decrease in input to the boiler means that less current will flow through the current transformer 62 and the reduction in current will permit switch lever 56 to be moved away from contact 47 by means of the spring. If the amount of resistance 63 in the shunt circuit is decreased, less current will flow through solenoid 57 whereupon the plunger of the solenoid will move downward to bring switch blade 56 into engagement with contact 53. This will close the circuit through solenoid 51 which will operate to close switch 40 whereupon motor 35 will be operated in a direction to move valve 32 toward open position. Pump 28 will thereupon deliver more water to the electrode chamber so that the level of the water in the electrode chamber will be raised. This will decrease the resistance between the electrodes 19 so that more power will be taken from the source of potential 22.

It will be clear that, instead of moving switch blade 56 by a means responsive to the power input to the boiler, as shown in the drawing, it may be moved by means responsive to other operating conditions of the boiler, such as for example, the steam pressure or the steam output. It is to be understood therefore that our invention is not limited to an operating means responsive to the particular condition illustrated.

If it is desired to operate valve 32 manually, switch blade 59 is placed in engagement with contact 68. As is obvious, the switches 39 and 40 may be then closed by means of push buttons 65 and 66 to operate the motor in directions to close and open valve 32.

As already stated, for any given level of water in the electrode chamber, the resistance between the electrodes varies with the salt content of the water, the resistance decreasing as the salt content increases and vice versa. We may take advantage of this fact for automatically operating the blow-off valve 34, and in Fig. 2 we have illustrated specifically apparatus for this purpose.

At 70 is an electric motor having a worm 71 on its shaft which meshes with a worm wheel 72 on the spindle of valve 34. By operating motor 70 in one direction valve 34 is opened and by operating it in the other direction, valve 34 is closed. Motor 70 is connected to source of potential 38 through a switch 73 which when closed operates motor 70 in a direction to open valves 34 and a switch 74 which when closed operates motor 70 in a direction to close valve 34. The source of potential 38 is connected to motor 70 by lead wires 75, 76 and 77. Switch 73 is adapted to be closed by a solenoid 78, one side of which is connected by a conductor 79 to a contact 80. The other side of solenoid 78 is connected by way of conductor 81, limit switch 82, conductor 83, and solenoid 84 to a contact 85, and by way of conductor 81, limit switch 82, conductor 83, contact 86, bridge piece 87, contact 88, and conductor 89 to a contact 90. Bridge piece 87 is carried by the plunger of solenoid 84 and associated with it is a dashpot 97 forming a time limit relay. The arrangement is such that when solenoid 84 is energized, the plunger will be instantly raised to move bridge piece 87 from engagement with terminals 86 and 88, but when the solenoid is deenergized an appreciable time will elapse before bridge piece 87 will have again moved into engagement with terminals 86 and 88.

Switch 74 is adapted to be closed by a solenoid 98 one side of which is connected to lead wire 76 by conductors 99 and 100. The other side of solenoid 98 is connected by a conductor 101 to a contact 102. Adjacent contact 102 is a contact 103 which is connected by a conductor 104, limit switch 105, conductor 106 and conductor 107 to lead wire 75. Contacts 102 and 103 are adapted to be connected together by a bridge piece 108 carried by the plunger of solenoid 78. When solenoid 78 is deenergized and switch 73 open, bridge piece 108 spans contacts 102 and 103 but when solenoid 78 is energized to close switch 73 bridge piece 108 is moved from engagement with contacts 102 and 103 and into engagement with contact 85 and a second contact 109 which is connected by a conductor 110 to conductor 106.

Adjacent contact 80 is a contact 98ª connected to conductor 100 and contacts 80 and 98ª are connected together by a bridge piece 98ᵇ carried by the plunger of solenoid 98. When solenoid 98 is deenergized and switch 74 open, bridge piece 98ᵇ connects contacts 80 and 98ª but when the plunger of solenoid 98 is raised to close switch 74 bridge piece 98ᵇ is moved from engagement with contacts 80 and 98ª.

The shaft of motor 70 is provided with a threaded extension 71ª along which moves an actuating finger 72ª for limit switches 82 and 105. Normally valve 34 is closed and when in such position finger 72ª stands in a position to hold limit switch 105 open as shown in Fig. 2.

At 111 is a switch blade connected to the plunger of a solenoid 112 and adapted to be moved by the solenoid when energized into engagement with contact 90. Solenoid 112 is connected by conductors 113 and 114 to current transformer 62 so that the current flowing through solenoid 112 will be proportional to the power input to the boiler. Connected in parallel to solenoid 112 is a manually adjustable resistance 115, and an automatically adjusted resistance 116, the two resistances being in series with each other. The amount of resistance 116 which is in the circuit is determined by the position of a contact finger 117 which is moved along a threaded rod 118 connected to the shaft of motor 35. Whenever motor 35 operates in a direction to close valve 32, contact finger 117 is moved toward the left to increase the amount of resistance 116 which is in circuit, and whenever motor 35 is operated in a direction to open valve 32, contact finger 117 is moved toward the right to decrease the amount of resistance 116 in the circuit.

It will be clear that each position of contact finger 117 corresponds to a definite opening of valve 32 and hence a definite water level in the electrode chamber of the boiler. It will also be clear that whenever the water level in the electrode chamber of the boiler is increased by opening valve 32, finger 117 will be automatically moved toward the right to cut out a part of resistance 116 and bring the contact finger to a point corresponding to the boiler input, and whenever the level of the water in the electrode chamber of the boiler is decreased by moving valve 32 toward closed position, finger 117 will be automatically moved toward the left to cut in a part of resistance 116 to again bring the contact finger to a point corresponding to the boiler input.

The arrangement is such that with finger 117 in a position corresponding to the boiler input, and with normal salt content in the water, the amount of current shunted through solenoid 112 will not be sufficient to cause it to raise its plunger to bring switch blade 111 into engagement with contact 90. When, however, the salt content of the water increases beyond a predetermined amount, a lower level of water will be required for the same amount of current through current transformer 62, consequently valve 32 will be more nearly closed than it should be thus increasing the amount of resistance 116 in the shunt circuit around solenoid 112. This will cause sufficient current to be shunted to relay 112 so that it will operate to move switch blade 111 into engagement with contact 90. This closes a circuit through solenoid 78 as follows: lead wire 75, conductor 107, switch blade 111, contact 90, conductor 89, contact 88, bridge piece 87, contact 86, conductor 83, limit switch 82, conductor 81, solenoid 78, conductor 79, contact 80, bridge piece 98ᵇ, contact 98ª and conductor 100 to lead wire 76.

When solenoid 78 is energized, it lifts its plunger to close switch 73 thereby closing the circuit on motor 70 to operate it in a direction to open valve 34. When plunger of solenoid 78 moves upward to close switch 73, bridge piece 108 is moved from engagement with contacts 102 and 103 and into engagement with contacts 85 and 109. This closes a holding circuit for solenoid 78 as follows: lead wire 75, conductor 107, conductor 106, conductor 110, contact 109, bridge piece 108, contact 85, solenoid 84, conductor 83, limit switch 82, conductor 81, solenoid 78, conductor 79, bridge piece 98$^b$, and conductor 100 to lead wire 76. A circuit is thus maintained on motor 70 independently of the switch blade 111 previously closed by solenoid 112.

The holding circuit for solenoid 78 includes solenoid 84 and when such circuit is closed solenoid 84 lifts its plunger thereby moving bridge piece 87 away from contacts 86 and 88. This opens the original circuit on solenoid 78 through contact 90 and switch lever 111 so that all the current for solenoid 78 passes through the holding circuit and cannot be affected by the position of switch blade 111. Furthermore, when the holding circuit is opened by actuating finger 72$^a$ opening limit switch 82, due to dashpot arrangement 97, a suitable time elapses before bridge piece 87 again spans contacts 86 and 88.

As soon as motor 70 begins to operate to open valve 34, finger 72$^a$ is moved away from limit switch 105 permitting it to close. The closing of switch 105 at this time, however, does not complete the circuit for solenoid 98 because such circuit is opened by bridge piece 108 having moved away from contacts 102 and 103. Motor 70 continues to operate until valve 34 has reached the desired degree of opening whereupon finger 72$^a$ engages limit switch 82 and opens it. This opens the holding circuit for solenoid 78 which is immediately deenergized whereupon switch 73 opens to stop the motor.

When switch 73 opens, bridge piece 108 is moved to span contacts 102 and 103 closing a circuit on solenoid 98 as follows: lead wire 75, conductor 107, conductor 106, limit switch 105 which is now closed, conductor 104, contact 103, bridge piece 108, contact 102, conductor 101, solenoid 98, conductor 99 and conductor 100 to lead wire 76. Plunger of solenoid 98 is thereupon raised to close switch 74 thereby connecting motor 70 to source of potential 38 in a manner to operate it in a direction to move valve 34 toward closed position. As soon as the motor begins to operate actuating finger 72$^a$ is moved away from limit switch 82 to permit it to close but this does not again close a circuit on solenoid 78 even should switch blade 111 be in engagement with contact 90, because when solenoid 98 was energized the circuit for solenoid 78 was opened by bridge piece 98$^b$ moving away from contacts, 80 and 98$^a$. Motor 70 will continue to operate until valve 34 is again closed whereupon actuating finger 72$^a$ will engage limit switch 105 opening it and breaking the circuit on solenoid 98 which will immediately drop its plunger and open switch 74. As soon now as time limit relay 84 closes, the parts will be in a position for a repetition of the cycle just described whenever switch blade 111 is again brought into engagement with contact 90.

It will thus be seen that whenever the salt content of the water increases beyond a predetermined amount, valve 34 will be automatically opened and closed. The opening and closing movement of the valve is continuous and it will be clear that limit switches 82 and 105 may be spaced apart such a distance and trip finger 72$^a$ caused to operate at such a speed that during the opening and closing movements of the valve 34 the desired amount of water will be blown off from the boiler. Of course, if a single opening and closing of the valve 34 does not permit sufficient blowing-off of water to freshen the content of the water to such an extent that switch blade 111 will move from engagement with contact 90 then the cycle will be immediately repeated, and this will continue as long as switch blade 111 remains in engagement with contact 90, although time limit relay 84 will prevent a repetition of the cycle until a certain time has elapsed. It will furthermore be seen that in case at any time it is desired to manually effect the opening and closing movement of valve 34 this may be done by adjusting resistance 115, or by manually moving switch blade 111 into engagement with contact 90. The primary purpose of the resistance 115 is to enable the automatic apparatus to be adjusted for operation in connection with water of different normal salt content.

Figs. 4, 5, 6 and 7 show electrode arrangements adapted for various power conditions. Fig. 4 shows an arrangement particularly adapted for use with a low voltage power supply, the electrodes 19$^a$ being in the form of angular plates arranged quite close together, whereby a path of comparatively low resistance is provided. Fig. 5 shows an arrangement similar to Fig. 3 except that a greater number of electrodes 19$^b$ are used, six being shown. Fig. 6 shows another arrangement well adapted for use with a low voltage power supply, the electrodes being in the form of curved plates. In this arrangement the electrodes 19$^c$ are connected to the power supply and the electrodes 19$^d$ are connected together or grounded. Fig. 7 shows an arrangement of electrodes adapted for use with a power supply of comparatively high voltage, there being barriers B of insulating material interposed between the electrodes 19$^e$ thereby lengthening the path of the current between electrodes.

In Fig. 8 we have illustrated a modification wherein the electrode chamber is in the form of a metal casing or basket 125, supported above the normal level of the water in the boiler by suitable legs 126. The electrodes 127 dip down into basket 125 terminating a suitable distance above its bottom. In the sides of the basket are perforations 128 through which water flows from the electrode chamber back to the lower portion of the boiler. Preferably, the lowermost of these perforations are a suitable distance above the lower ends of electrodes 27 for the same purpose as has been explained in connection with pipes 25 in Fig. 1. Otherwise the arrangement of Fig. 8 may be substantially the same as shown in Fig. 1. In Fig. 8 however we have indicated the valve 129 which regulates the pump and the valve 130 which regulates the blow-off as being arranged for manual operation only.

In Fig. 9 we have illustrated an arrangement wherein the pipes 25 of Fig. 1 are omitted, their function being performed by providing holes 131 in equalizing pipes 132, corresponding to the pipes 24 of Fig. 1. The holes 131 are located at a level above the ends of the electrodes indicated at 133 for the purpose already described in connection with Figs. 1 and 8. By this arrangement equalizing pipes 132 perform three functions, that of equalizing the pressure in the boiler, defining the high level limit in the electrode chamber and providing for the flow of water from the electrode chamber back to the lower end of the boiler.

It will be clear that instead of regulating the pump, i. e., regulating the flow of water from the boiler to the electrode chamber in order to regulate the level of water in the electrode chamber, we may perform this same function by regulating the rate at which the water flows from the electrode chamber back to the lower portion of the boiler. In Fig. 1ᵇ we have illustrated diagrammatically an arrangement for this purpose. In this arrangement a suitable conduit 135 provided with a valve 136 connects the electrode chamber to the lower portion of the boiler so that water may run back through it from the electrode chamber to the lower portion of the boiler. Valve 136 may be manually controlled or it may be automatically controlled after the manner already described in connection with Fig. 1.

It will be clear that the electrode chamber itself may form an electrode and also that we may utilize several boiler units connected in parallel and in Fig. 9ᵃ an arrangement of this character is illustrated.

Referring to Fig. 9ᵃ, the boiler shell comprises a casing 140 which forms a common supply chamber to which is connected a feed water pipe 141 provided with a float controlled valve 142 of the general character already described. Projecting upwardly from casing 140 are a plurality of domes 143 in each of which is a basket 144 forming an electrode chamber. Baskets 144 are of the same general type as that shown in Fig. 8 except that only a single row of overflow holes 145 are provided. Projecting into the electrode chambers are electrodes 146 which are connected to a source of potential 147. The electrode chambers 144 are electrically connected together by connectors 148. The circulating pump 149 has its suction side connected to casing 140 by a pipe 150 and its discharge side connected in multiple to electrode chambers 144 by pipes 151. In the discharge pipe is a valve 152 for regulating the pump 149 and in pipes 151 are valves 153 for regulating the flow to each individual electrode chamber. The steam discharge conduits are indicated at 154 and the blow-off conduit for freshening the water at 155. In conduit 155 is a suitable blow-off valve 156. The arrangement in general is similar to those already described being in certain respects a multiplication thereof and its operation will be understood from the descriptions already given. The automatic control features, if desired, may be applied to the arrangement as is obvious. It will be clear that, viewed from one aspect, domes 143 constitute separate boiler units having a common supply chamber.

In the foregoing specification we have referred particularly to water as being the liquid used in the boiler as this is the one commonly met with. It will be understood, however, that the invention is not necessarily limited to use with water and that in using this term we intend to include water or any equivalent liquid which it may be found desirable to use.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States, is—

1. In an electric boiler, a shell, a feed water pipe for supplying water to it, an electrode chamber in the shell above the level of the water therein, one or more electrodes which project into the electrode chamber, a pump for supplying water from the shell to the electrode chamber, and means for regulating the pump to regulate the level of water in the electrode chamber.

2. In an electric boiler, a shell, a feed water pipe for supplying water to it, an electrode chamber in the shell above the level of the water therein, one or more electrodes which project into the electrode chamber, means for circulating water from the shell to the electrode chamber and back to the shell, and means for regulating such circulation.

3. In an electric boiler, a shell, a feed water pipe for supplying water to it, an electrode chamber in the shell above the level of the water therein, one or more electrodes which project into the electrode chamber, and a pump for supplying water from the shell to the electrode chamber, a wall of said chamber being provided with an opening through which water flows from the electrode chamber to the shell.

4. In an electric boiler, a shell, a feed water pipe for supplying water to it, an electrode chamber in the shell above the level of the water therein, one or more electrodes which project into the electrode chamber, a pump for supplying water from the shell to the electrode chamber, a wall of said chamber being provided with an opening through which water flows from the electrode chamber to the shell, and regulable means for determining the level of the water in the electrode chamber.

5. In an electric boiler, a shell, a feed water pipe for supplying water to it, an electrode chamber in the shell above the level of the water therein, one or more electrodes which project into the electrode chamber, a pump for supplying water from the shell to the electrode chamber, a wall of said chamber being provided with an opening through which water flows from the electrode chamber to the shell, and means for regulating said pump.

6. In an electric boiler, a shell, a feed water pipe for supplying water to the lower end of the shell, a transverse partition in the shell above the level of the water supply therein, one or more electrodes in the shell above said partition, conduit means for conveying water from the lower end of the shell to the space above said partition, and conduit means for conveying water from the space above said partition to the lower end of the shell.

7. In an electric boiler, a shell, a feed water pipe for supplying water to the lower end of the shell, a transverse partition in the shell above the level of the water supply therein, one or more electrodes in the shell above said partition, and conduit means for conveying water from the lower end of the shell to the space above said partition, said partition being provided with an opening or openings through which water runs from the space above the partition to the lower end of the shell.

8. In an electric boiler, a shell, a feed water pipe for supplying water to the lower end of the shell, a transverse partition in the shell above the level of the water supply therein, one or more electrodes in the shell above said partition, means for transferring water from the lower end of the shell to the space above said partition, and conduit means for conveying water from a point above the lower ends of the electrodes to the lower end of the shell.

9. In an electric boiler, a shell, a feed water pipe for supplying water to the lower end of the shell, a transverse partition in the shell above the level of the water supply therein, one or more electrodes in the shell above said partition, conduit means for conveying water from the lower end of the shell to the space above said partition, and conduit means for conveying water from the space above said partition to the lower end of the shell.

10. In an electric boiler, a shell, a feed water pipe for supplying water to the lower end of the shell, a transverse partition in the shell above the level of the water supply therein, one or more electrodes in the shell above said partition, conduit means for conveying water from the lower end of the shell to the space above said partition, conduit means for conveying water from the space above said partition to the lower end of the shell, and conduit means which connects the space above the water in the lower end of the shell with the top of the shell for equalizing the pressure on the two sides of the partition.

11. In an electric boiler, a shell, a feed water pipe for supplying water to the lower end of the shell, a transverse partition in the shell above the level of the water supply therein, one or more electrodes in the shell above said partition, and conduit means for conveying water from above the partition to the space below it and for equalizing the pressure in the casing.

12. In an electric boiler, a shell, a feed water pipe for supplying water to it, an electrode chamber in the shell above the level of the water therein, one or more electrodes which project into the electrode chamber, means for circulating water from the shell to the electrode chamber and back to the shell, and means for withdrawing water to freshen the supply.

13. In an electric boiler, a shell, an electrode chamber, one or more electrodes which project into said chamber, means for supplying water to said shell, means for supplying water from the shell to the electrode chamber, and means for regulating the level of the water in both the shell and electrode chamber.

14. In an electric boiler, a casing, an electrode chamber in the casing, a feed water pipe for supplying water to the casing, a pump for setting up a continuous circulation of water from the casing through the electrode chamber and back to the casing, and means for regulating the flow of water to maintain the desired level of water in the electrode chamber.

15. In an electric boiler, a casing, an electrode chamber in the casing, a feed water pipe for supplying water to the casing, a pump for setting up a continuous circulation of water from the casing through the electrode chamber and back to the casing, and means for regulating the pump to maintain the desired level of water in the electrode chamber.

16. In an electride boiler, a casing, an electrode chamber in the casing, a feed water pipe for supplying water to the casing, a pump for setting up a continuous circulation of water from the casing through the electrode chamber and back to the casing, means for regulating the flow of water to maintain the desired level of water in the electrode chamber, and means for withdrawing water from the casing to effect a freshening of the water therein.

17. In an electric boiler, a casing an electrode chamber in the casing, a feed water pipe for supplying water to the casing, a pump for setting up a continuous circulation of water from the casing through the electrode chamber and back to the casing, and means responsive to an operating condition of the boiler for regulating the flow of water to maintain the desired water level in the electrode chamber.

18. In an electric boiler, a casing, an electrode chamber in the casing, a feed water pipe for supplying water to the casing, a pump for setting up a continuous circulation of water from the casing through the electrode chamber and back to the casing, and means responsive to the power input to the boiler for regulating the flow of water to maintain the desired water level in the electrode chamber.

19. In an electric boiler, a casing, an electrode chamber in the casing, a feed water pipe for supplying water to the casing, a pump for setting up a continuous circulation of water from the casing through the electrode chamber and back to the casing, and means responsive to an operating condition of the boiler for regulating said pump.

20. In an electric boiler, a casing, a feed water pipe for supplying water to the casing, an electrode chamber in the casing above the level of the water therein, one or more electrodes projecting into it, means for conveying water from the casing to the electrode chamber, and means for regulating the depth to which the electrodes are submerged in the water in the electrode chamber.

21. In an electric boiler, a casing, a feed water pipe for supplying water to the casing, an electrode chamber in the casing above the level of the water therein, one or more electrodes projecting into it, means for setting up a continuous circulation of water from the casing to the electrode chamber and back to the casing, and means for regulating the depth to which the electrodes are submerged in the water in the electrode chamber.

22. In an electric boiler, a casing containing a supply of water in its lower portion, an electrode chamber in the casing above the level of the water supply therein, one or more electrodes projecting into said chamber, a pump for supplying water from the casing to the electrode chamber, conduit means for conveying water from the electrode chamber back to the supply in the casing, and means for regulating the depth to which the electrodes are submerged in the water in the electrode chamber.

23. In an electric boiler, a casing, means for supplying water thereto, one or more electrodes which project into the casing, and means responsive to the salt content of the water in the casing for effecting a freshening of the water in the casing.

24. In an electric boiler, a casing, means for supplying water thereto, one or more electrodes which project into the casing, a conduit for discharging water from the casing, a valve in said conduit, and means responsive to the salt content of the water in the casing for actuating said valve.

25. In an electric boiler, a casing, a float controlled means for maintaining a substantially constant level of water in the casing, one or more electrodes in the casing, a conduit connected to the casing, a valve in said conduit, and means responsive to the salt content of the water in the casing for opening and closing said valve.

26. In an electric boiler, a casing, a wall therein which defines a supply chamber and an electrode chamber, a conduit for supplying water to the supply chamber, one or more electrodes which project into the electrode chamber, and means for setting up a continuous circulation of water between said chambers.

27. In an electric boiler, a casing, a wall therein which defines a supply chamber and an electrode chamber, a conduit for supplying water to the supply chamber, one or more electrodes which project into the electrode chamber, means for setting up a continuous circulation of water between said chambers, and means for regulating the boiler.

28. In an electric boiler, a casing, a transverse partition therein which defines a supply chamber and an electrode chamber, one or more electrodes in the electrode chamber, and means for setting up a circulation of water from the supply chamber to the electrode chamber.

29. In an electric boiler, a casing, an electrode chamber in the casing, a feed water pipe for supplying water to the casing, a pump for setting up a continuous circulation of water from the casing through the electrode chamber and back to the casing, means responsive to an operating condition of the boiler for regulating the flow of water to maintain the desired water level in the electrode chamber, and means responsive to the salt content of the water for withdrawing water to freshen the supply.

30. In an electric boiler, a casing, an electrode chamber, one or more electrodes projecting into the electrode chamber, a valve for supplying water to the casing, a valve for withdrawing water therefrom, motors for operating said valves, means responsive to an operating condition of the boiler for controlling the valve for the water supply, and means responsive to the salt content of the water for controlling the second named valve.

31. In an electric boiler, a casing, a plurality of electrode chambers therein, electrodes in said chambers, and means for supplying water to said chambers.

32. In an electric boiler, a casing, a plurality of electrode chambers therein, an electrode in each chamber, and means for supplying water to said chambers.

33. In an electric boiler, a casing comprising a supply chamber and a plurality of electrode chambers, means for setting up a circulation from the supply chamber through the electrode chambers and back to the supply chamber, and electrodes projecting into said electrode chambers.

34. In an electric boiler, a casing, a water supply therein, electrode members in the casing, and means forming a chamber through which water is continuously circulated from the water supply, the electrode members being immersed in the water in said chamber.

35. In an electric boiler, a casing comprising a supply chamber and a plurality of domes, means forming an electrode chamber in each dome, electrodes in said electrode chambers, and means for supplying water from the supply chamber to the electrode chambers.

36. In an electric boiler, a casing comprising a supply chamber and a plurality of domes, means forming an electrode chamber in each dome, electrodes in said electrode chambers, and means for setting up a continuous circulation of water from the supply chamber through the electrode chambers.

37. In an electric boiler, a casing, a supply of water therein, an electrode supported in the casing above the level of the water supply, and means whereby water may be supplied to the electrode to submerge it to a predetermined degree.

In witness whereof, we have hereunto set our hands this 13th day of February, 1922.

WILBUR L. MERRILL.
HARRY A. WINNE.